US010223812B2

(12) United States Patent
Bennett et al.

(10) Patent No.: US 10,223,812 B2
(45) Date of Patent: Mar. 5, 2019

(54) IMAGE VALIDATION

(71) Applicant: Amazon Technologies, Inc., Seattle, WA (US)

(72) Inventors: Eric Paul Bennett, Seattle, WA (US); Thomas Lund Dideriksen, Seattle, WA (US); Brian Jackson, Seattle, WA (US); Gregory James Nyssen, Seattle, WA (US); Dirk Ryan Padfield, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 15/347,561

(22) Filed: Nov. 9, 2016

(65) Prior Publication Data

US 2018/0096497 A1 Apr. 5, 2018

Related U.S. Application Data

(60) Provisional application No. 62/402,839, filed on Sep. 30, 2016.

(51) Int. Cl.
G09G 5/00 (2006.01)
G06T 11/00 (2006.01)
(Continued)

(52) U.S. Cl.
CPC ............ *G06T 11/001* (2013.01); *G06K 9/036* (2013.01); *G06T 3/60* (2013.01); *G06T 5/001* (2013.01); *G06T 11/60* (2013.01); *G11B 27/031* (2013.01); *H04L 67/06* (2013.01); *H04N 5/23216* (2013.01); *H04N 5/23222* (2013.01);
(Continued)

(58) Field of Classification Search
None
See application file for complete search history.

(56) References Cited

U.S. PATENT DOCUMENTS 8,837,806 B1 * 9/2014 Ethington .............. G06Q 40/02
382/140
2004/0078331 A1 * 4/2004 Fakih .................... G06Q 20/10
705/40

(Continued)

OTHER PUBLICATIONS

International Search Report and Written Opinion dated Jan. 18, 2018, issued in corresponding PCT/US2017/053927.

*Primary Examiner* — David H Chu
(74) *Attorney, Agent, or Firm* — Knobbe, Martens, Olson & Bear, LLP

(57) ABSTRACT

Systems and methods are described for providing an image validation module. The image validation mobile enables capture, enhancement, validation, and upload of a digital image to a networked computing service, applying criteria that correspond to image validation criteria used by the networked computing service. The image validation mobile may be executed on a mobile computing device, and may authenticate itself to the networked computing service to indicate that digital images have already been validated. The image validation module may provide feedback before, during, or after image capture to enable the capture of valid images, and may provide feedback before, during, or after image enhancement to allow issues that prevent a digital image from passing validation to be addressed.

19 Claims, 11 Drawing Sheets

(51) Int. Cl.
  *G06T 3/60* (2006.01)
  *G06T 11/60* (2006.01)
  *H04L 29/08* (2006.01)
  *G06K 9/03* (2006.01)
  *G06T 5/00* (2006.01)
  *G11B 27/031* (2006.01)
  *H04N 5/232* (2006.01)
  *H04N 9/04* (2006.01)

(52) U.S. Cl.
  CPC ......... *H04N 5/23229* (2013.01); *H04N 9/045* (2013.01); *G06T 2210/22* (2013.01)

(56) References Cited

U.S. PATENT DOCUMENTS

2013/0148862 A1\* 6/2013 Roach .................... G06Q 40/02
                                                    382/112
2015/0139506 A1    5/2015 Wang
2017/0180346 A1\* 6/2017 Suarez ................ G06F 9/45558

\* cited by examiner

IMAGE VALIDATION

CROSS-REFERENCE TO RELATED APPLICATION

This application claims the benefit of U.S. Provisional Application No. 62/402,839, entitled IMAGE VALIDATION, and filed Sep. 30, 2016, the entirety of which is hereby incorporated by reference herein.

BACKGROUND

Generally described, companies and organizations operate numerous computing systems that may be interconnected via one or more public or private networks. These networked computing systems may provide networked computing services, such as network access, database access, computing hardware and resources (e.g., storage, processing power, etc.), software, and other services. To facilitate usage, networked computing services may permit users to upload digital images to be presented or used in conjunction with the service. The networked computing service may require that uploaded images meet various requirements relating to image quality, such as having a sufficient resolution or an adequate light level, and may reject images that do not meet the service's requirements.

Mobile computing devices may be used to capture digital images. For example, a smartphone may include hardware and/or software that allows a user to take photos, edit or post-process them (e.g., cropping, rotating, adjusting color and light levels, applying filters, and so forth), store photos on the device, and transmit them via a network to a networked computing service. As mobile computing devices are equipped with larger and more capable image sensors, the file sizes of captured digital images increase. In addition, mobile computing devices may have limited bandwidth or may operate in an offline mode in remote areas. Uploading images from a mobile computing device may thus be expensive or time-consuming, and uploading an image that meets the requirements of the networked computing service may require multiple attempts.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
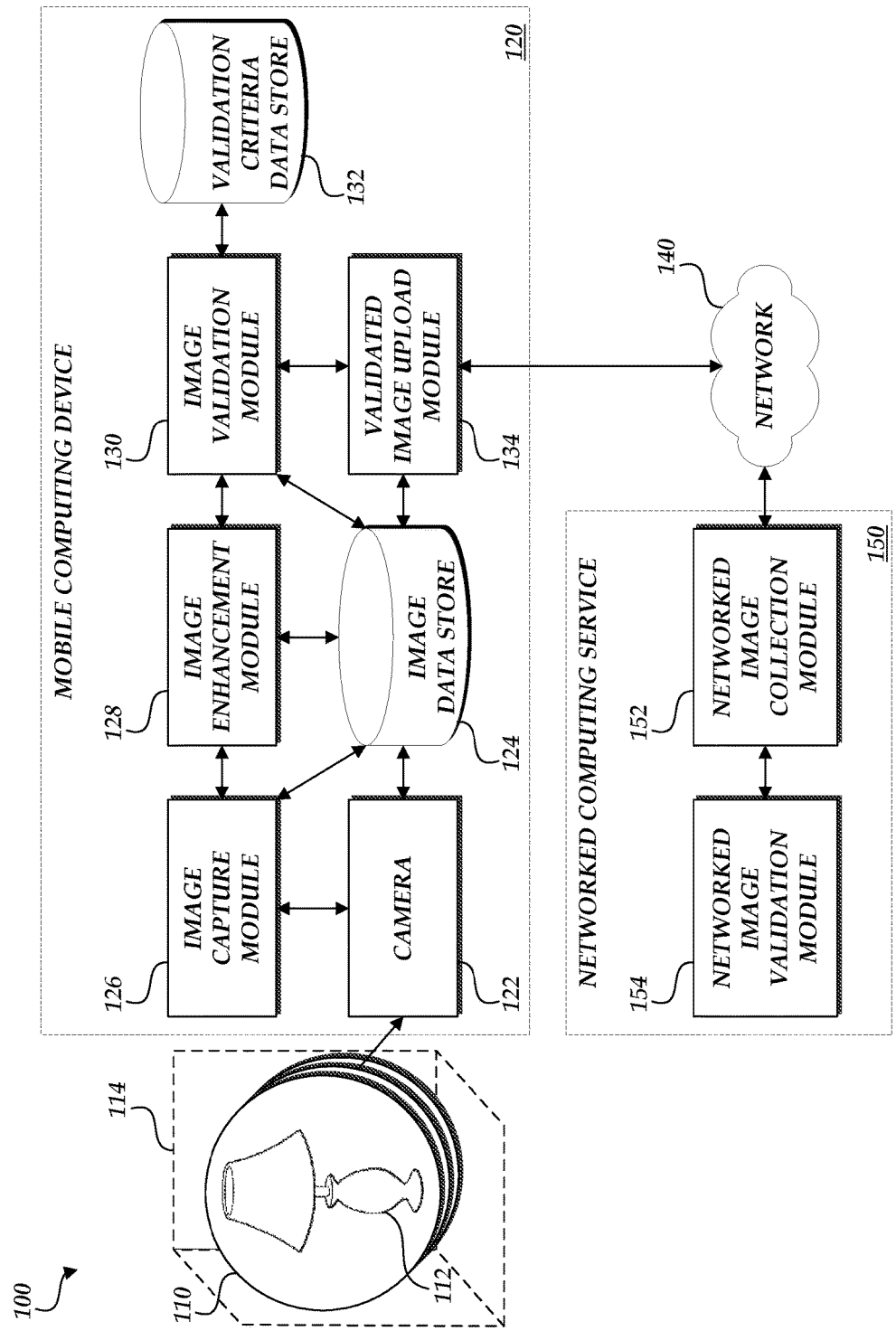
FIG. 1 depicts a schematic block diagram of an illustrative network topology including a mobile computing device, a networked computing service, and an item to be digitally imaged.

Generally described, aspects of the present disclosure relate to capturing, enhancing, and validating digital images. More specifically, aspects of the present disclosure are directed to systems, methods, and computer-readable media related to providing an image validation service on a mobile computing device. Illustratively, a mobile computing device (e.g., a smartphone or other device equipped with camera hardware and software) may capture digital images, store them, and allow the user to edit and post-process stored images. These digital images may vary in quality depending on characteristics of the mobile computing device, the photography skills of the user, local conditions at the time and place of the digital image capture (e.g., the time of day, whether the subject or the photographer are in motion, etc.), and other factors.

A networked computing service may allow users to upload digital images. Illustrative examples of networked computing services that may allow digital image uploads include, but are not limited to, photo galleries, dating services, e-commerce sites, messaging services, social networks, weblogs, comment systems, and other media. As a non-limiting example, a social network or dating service may allow users to upload personal profile images. As a further non-limiting example, an e-commerce service may allow sellers to upload images of products that the user wishes to offer for sale via the e-commerce service.

The networked computing service may evaluate uploaded images and verify that the images meet various requirements. For example, a networked computing service may verify that an uploaded image has a minimum resolution or a maximum file size. The networked computing service may also apply criteria regarding the content of the digital image, such as requiring that the subject of the image be centered and level, that the subject can be easily distinguished from the background, that the background be of a uniform color (e.g., that the subject has been photographed against a white background), that the subject is properly lit and in focus, and so forth. The networked computing service may implement various processes and algorithms to validate uploaded images and decide whether to accept or reject them. However, the networked computing service can only validate digital images after they have been uploaded. Uploading digital images that are subsequently rejected by the networked computing service may cause significant waste of time, bandwidth, processing power, and battery life, especially on mobile computing devices. The time and effort of the user (e.g., to gain access to the subject, set up lighting, provide a suitable backdrop, etc.), may also be wasted in the production of images that cannot be used.

To reduce the likelihood of uploading a digital image that is subsequently rejected by a networked computing service, the mobile computing device may implement a local image validation module. Illustratively, the image validation module may determine whether an image will meet the validation criteria of the networked computing service prior to uploading, or in some embodiments, prior to image enhancement or capture. In various embodiments, the image validation module may implement some or all of the criteria that the networked computing service applies to uploaded images. In other embodiments, the image validation module may implement alternative processes or algorithms to estimate whether the image will be validated by the networked computing service. For example, the networked computing service may use an algorithm for image validation that requires more processing power than the mobile computing device can make available. The image validation module on the mobile computing device may thus implement an alternative algorithm which uses less processing power, but still provides the user with some amount of information regarding whether the networked computing service will accept or reject the image. In some embodiments, the image validation module may maintain a library of algorithms, and may select which algorithm to use based on characteristics of the mobile computing device such as processor version, currently available processing power, battery level, or other criteria. In further embodiments, the image validation module may obtain algorithms or criteria from an external source, such as a data store provided by the networked computing service.

The image validation module may provide a user interface. The user interface may illustratively allow the user to submit images for validation, indicate whether the image passed or failed various validation tests, and provide feedback to the user regarding an image which did not validate. For example, the image validation module may indicate to the user that an image failed a validation test because the image was out of focus, or because the image needed to be cropped to exclude more of the background. The image validation module may indicate whether an edited version of the image would validate (e.g., if it were rotated so that the subject was level), or may recommend re-taking the image under different conditions. For example, if an image fails validation due to motion blur, the image validation module may recommend re-capturing the image using a shorter exposure.

Aspects of the present disclosure further include an image enhancement module, which may be implemented separately or in conjunction with the image validation module. The image enhancement service may provide a user interface with various tools enabling a user to edit a digital image locally. The editing tools may include functions such as rotating the image, cropping it, removing or de-emphasizing the background, adjusting color and light levels, applying filters, and other processes. Illustratively, the image enhancement module may make recommendations to the user as to which tools or processes to use to improve the image. These recommendations may be based on characteristics of the original image, validation criteria applied by the image validation module, enhancement criteria applied by the image enhancement module, or any combination thereof. As an example, the image enhancement module may detect that the original digital image is below the module's recommended brightness threshold, may determine that increasing the image's brightness by 20% would cause the image to be above the threshold, and may recommend increasing (or, in some embodiments, may automatically increase) the image's brightness by 20%. As a further example, the image enhancement module may analyze the white balance of an image, determine that it falls outside a range that the image validation service will accept, and recommend adjusting the white balance to fall within the range.

In certain embodiments, the image enhancement module may apply its recommended edits to a digital image without user intervention. For example, the image enhancement module may implement a "batch mode" in which it analyzes and edits multiple images. Illustratively, the image enhancement module may implement a batch mode by applying user edits of a first image to multiple images, by applying the image enhancement module's default recommendations to multiple images, or any combination thereof.

In some embodiments, the image enhancement module may utilize machine learning or pattern analysis to determine whether various edits, when applied to images having various characteristics, cause the image to be more likely to pass validation. The image enhancement module may thus modify its recommendations. In embodiments where the mobile computing device provides sufficient processing power, the image enhancement module may dynamically test edited images, or dynamically test potential edits to an image, and provide real-time or near-real-time feedback. The image enhancement module may provide edited images to the mobile computing device's image validation module, receive and process feedback from the image validation module, and thereby indicate to the user whether an image as currently edited passes validation. For example, the image enhancement module may display a message to the user, such as a checkmark or a "pass" message, when the image has been edited in a manner that causes it to be validated by the image validation module. The image enhancement module may also indicate that a particular edit, if made or approved by the user, would cause the image to pass validation. In further embodiments, various elements of the image enhancement module and image validation module may be combined or may operate in parallel, such that outputs of the image validation module are inputs to the image enhancement module and/or vice versa. In other embodiments, the image enhancement module and image validation module may be implemented separately and independently.

Further aspects of the present disclosure include an image capture module. The image capture module, in some embodiments, may provide the user with real-time or near-real-time feedback during the image capture process to indicate whether the image to be captured meets various requirements of the image validation module. For example, the image capture module may indicate that the subject of the image is out of focus, inadequately lit, too close or too far from the camera, or provide other feedback to assist the user with image capture. In some embodiments, the image capture module may provide a capture button that the module automatically enables or disables based on, for example, an analysis of whether the resulting image would pass validation. In further embodiments, the image capture module captures the image automatically when it detects that the resulting image would meet some or all of the validation criteria.

In embodiments where the mobile computing device provides sufficient processing power, the image capture module may implement all or part of the image enhancement module and the image validation module in real time or near-real time. For example, the image capture module may adjust the white balance, aperture, focal length, shutter speed, and/or other camera settings based on a dynamic validation of a viewfinder image, and may capture the viewfinder image when it determines that the viewfinder image passes validation. One skilled in the art will appreciate that "capture," as used herein, refers to the act of storing a digital image in a data store to enable subsequent viewing, processing, analysis, or usage. "Viewfinder image," as used herein, refers to a stream of one or more digital images that are potential candidates for capture, and that may be presented as such by the mobile computing device (e.g., in a simulation of an analog camera's viewfinder). The image capture module may thus implement real time or near-real time processing of viewfinder images before or during their capture, and/or may temporarily capture viewfinder images to enable processing by the image enhancement module or the image validation module.

In further embodiments, the image capture module may detect a controlled environment that facilitates the capture of digital images. The image capture module may illustratively detect a controlled environment by detecting a radio frequency identifier (RFID) tag or other wireless signal associated with the controlled environment, a visual or audio signal presented by the controlled environment, through user input, or by other means. The controlled environment may provide, for example, standard lighting conditions, a uniform background, a specified distance between camera and subject, or other features that allow the image capture module to establish a baseline for the environmental conditions at the time of image capture. In further embodiments, the image capture module may reject or prevent capture of images that the service detects are not captured in the controlled environment.

Still further aspects of the present disclosure include a validated image upload module. The validated image upload module may upload images that have been validated by the image validation module to a networked computing service. In some embodiments, the validated image upload module may indicate to the networked computing service that the image has already been validated, and thus does not need to be validated further by the networked computing service. As will be appreciated and as further discussed below, all of the image processing and editing discussed above prior to image upload by the validated image upload module may be implemented, in some embodiments, entirely by a mobile computing device as local modules provided by one or more applications executed by the mobile computing device.

In some embodiments, the validated image upload module may authenticate itself, the validated image, or the image verification module to the networked computing service. For example, the validated image upload module may transmit a checksum, a version number, or other authentication token to the networked computing service. The validated image upload module may authenticate on a per-session basis, a per-image basis, as a one-time measure, or at other times. The networked computing service may, in some embodiments, respond to an authentication request by indicating that the image validation module is out of date, and that the validation tests performed by the networked computing service no longer match those performed by the image validation module on the mobile computing device. The networked computing service may optionally continue to accept images from an outdated image validation module, and process them as though they had passed validation tests on the networked computing service, or may reject the images. In some embodiments, the networked computing service may indicate which versions of the image validation module are permitted to validate images on its behalf In other embodiments, the networked computing service may provide information enabling the image validation module to update its verification criteria. In some embodiments, the validated image upload module may provide a user interface that allows selection of validated images, and that further notifies the user that the image verification module needs to be updated, its validation algorithms need to be updated, or its validation algorithms have been updated.

The foregoing aspects and many of the attendant advantages will become more readily appreciated as the same become better understood by reference to the following descriptions of illustrative embodiments, when taken in conjunction with the accompanying drawings depicting the illustrative embodiments.

FIG. 1 depicts a schematic block diagram of an illustrative network topology 100 that implements aspects of the present disclosure. The illustrated network topology 100 includes a mobile computing device 120, which is illustrated in further detail in FIG. 8. The mobile computing device 120 may generally include any computing device that interacts with the networked computing service 150 in the manner described herein. While the term "mobile" is used in reference to the mobile computing device 120, the mobile computing device 120 should not be construed as limited to devices equipped for mobile communication. Rather, examples of a mobile computing device 120 include, but are not limited to, smartphones, tablet computers, laptops, personal computers, wearable computing devices, personal digital assistants (PDAs), hybrid PDA/mobile phones, electronic book readers, digital media players, integrated components for inclusion in computing devices, appliances, electronic devices for inclusion in vehicles or machinery, gaming devices, set top boxes, electronic devices for inclusion in televisions, and the like.

The mobile computing device 120 is in communication with a camera 122. In the illustrated embodiment, the camera 122 is depicted as an internal component of the mobile computing device 120. In other embodiments, the camera 122 may be remotely controlled by the mobile computing device 120, or may otherwise communicate images to the mobile computing device 120. The camera 122 may illustratively be a smartphone camera, a digital camera connected to the mobile computing device 120 via a wired or wireless network, or another device capable of capturing digital images. In further embodiments, the camera 122 may be omitted, and the image enhancement service 128 and image verification service 130 may process images obtained from sources other than the camera 122.

In the illustrated embodiment, the camera 122 may be used to capture digital images 110 depicting a subject 112. While the subject 112 is depicted in FIG. 1 as an inanimate object, the present disclosure is not limited to any particular type or category of subject. For example, the subject 112 may be a person, animal, article of clothing, vehicle, jewelry, house or other real property, landmark, consumer product, or other item. Digital images 110 may be in any digital format, such as JPEG, GIF, RAW image data, or other formats. In some embodiments, the subject 112 may be placed in a controlled environment 114, which provides a baseline set of lighting conditions, backdrops, or otherwise controls environmental factors that may affect the quality of digital images 110 of the subject 112.

The mobile computing device 120 may further be equipped with an image data store 124. The image data store 124 may store the digital images 110 captured via the camera 122, as well as other digital images from other sources. Illustratively, the image data store 124 may be any non-transitory computer-readable medium, including but not limited to a hard disk drive, solid state device, flash drive, and the like.

In the illustrated embodiment, the mobile computing device 120 includes an image capture module 126, which enables user capture of digital images 110 via the camera 122. In some embodiments, the image capture module 126 may be omitted, and the image enhancement module 128 and image validation module 130 may process digital images that are captured via other software on the mobile computing device 120.

The mobile computing device 120 may further include an image enhancement module 128, which enables enhancement of digital images 110. In some embodiments, the image enhancement module 128 may be combined with, or may provide some of the functionality of, the image capture module 126. In other embodiments, the image enhancement module 128 may be omitted, and the image validation module 130 may instead process unedited digital images 110.

In some embodiments, the image enhancement module 128 provides a user interface that enables the user to select, apply, and receive feedback regarding various enhancements and their effect on image validation. For example, the image enhancement module 128 may provide user interface controls that enable the user to adjust the brightness of a digital image 110, and may provide feedback to indicate to the user that reducing the brightness of an overexposed image will increase the likelihood of passing validation. In further embodiments, as described above, the image enhancement module 128 may provide dynamic feedback on whether various enhancements increase or reduce the likelihood of validation.

The mobile computing device 120 further includes an image validation module 130, which may determine whether digital images 110 meet requirements of the networked computing service 150. As described in detail below, the image validation module 130 may perform various tests on the digital images 110 to determine whether the remote image validation module 156 on the networked computing service 150 would validate the digital images 110. The mobile computing device 120 further includes a validation criteria data store 132, which stores algorithms, criteria, and other information utilized by the image validation module 130.

In some embodiments, the mobile computing device 120 further includes a validated image upload module 134, which uploads validated images to the networked computing device 150 via a network 140. The network 140 may be, for instance, a wide area network (WAN), a local area network (LAN), or a global communications network. The validated image upload module 134 may illustratively transmit additional information with validated images to authenticate or confirm that the images have been validated.

The image capture module 126, image enhancement module 128, image validation module 130, and validated image upload module 134 may be implemented in a variety of ways within the scope of the present disclosure. For example, these services may be implemented within a single application executing on the mobile computing device 120, as pluggable components that can be invoked by multiple applications on the mobile computing device 120, combined in various ways into separate applications, and so forth. In some embodiments, the image validation module 130 may select and apply different validation criteria depending on which application invokes the image validation module 130.

The illustrated network topology 100 further includes a networked computing service 150, which in turn comprises an image collection module 152 and a networked image validation module 154. As described above, the networked computing service 150 may be any service that is provided separately from the mobile computing device 120, receives digital images 110, and validates whether the received images meet its criteria.

The networked image collection module 152 may provide user interfaces or application programming interfaces (APIs) for uploading images to the networked computing service 150. These interfaces may be used by the validated image upload module 134 to upload digital images 110. The networked image collection module 152 may further provide authentication services to the validated image upload module 134 or the image validation module 130, and may provide feedback or other information regarding the uploaded digital images 110.

In the illustrated embodiment, the networked computing service 150 further includes a networked image validation module 154. The networked image validation module 154 performs validation tests corresponding to those performed by the image validation module 130 on the mobile computing device 120. Illustratively, the networked image validation module 154 may perform validation tests that are identical to the tests performed by the image validation module 130, or may apply other or different tests. In some embodiments, the networked image validation module 154 is omitted, and the networked computing service 150 relies on the mobile computing device 120 to validate digital images.

The networked computing service 150 may include additional components beyond those depicted in FIG. 1. For example, the networked computing service 150 may include an uploaded image data store configured to store the digital images 110 uploaded to the networked computing service 150, a user interface for uploading, displaying, and managing validated digital images 110, or other components relating to the service or services provided by the networked computing service 150. Further, communication between the mobile computing device 120 and the networked computing service 150 may involve additional components beyond those depicted as communicating in FIG. 1. For example, as described in more detail below, the image validation module 130 may obtain validation criteria from the networked image validation module 154 via network 140.

Figure 2:
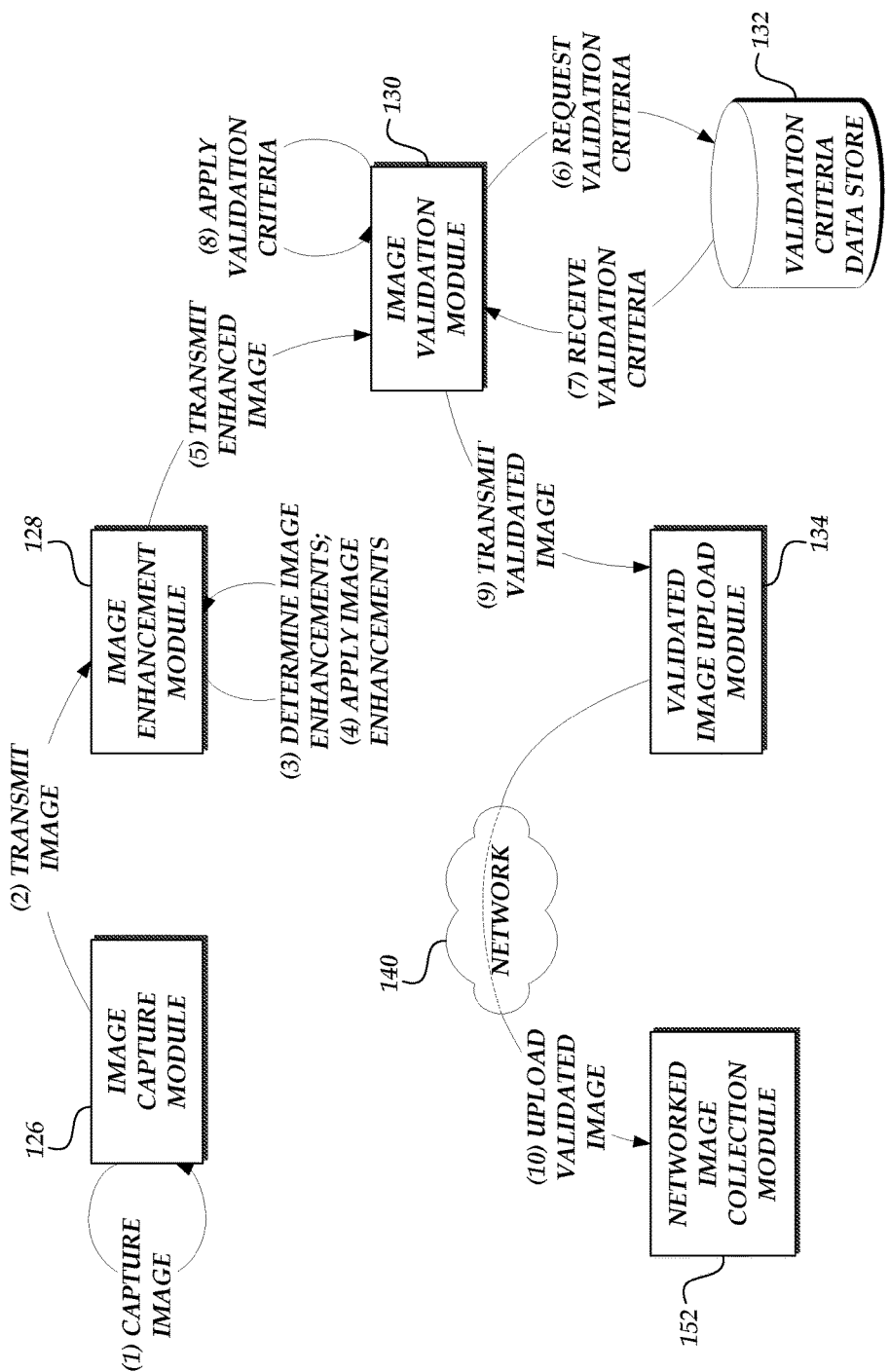
FIG. 2 is an illustrative block diagram depicting capture, enhancement, validation, and uploading of an image in accordance with aspects of the present disclosure.

With reference now to FIG. 2, a block diagram illustrating capture, enhancement, validation, and uploading of an image will be described. At (1), an image capture module 126 captures an image (e.g., the digital image 110 depicted in FIG. 1). As described above, the image capture module 126 may control or otherwise interact with a camera 122 or other device, and may provide a user interface to enable user capture or user-assisted capture of the image. In some embodiments, the image capture module 126 may collect additional information along with the image. For example, the image capture module 126 may collect geolocation data, accelerometer readings, date and time information, a user-provided caption or description, or other information associated with the image. In further embodiments, as discussed above, the image capture module 126 may detect a controlled environment (e.g., the controlled environment 114 of FIG. 1). The image capture module 126 may thus collect or obtain information about the controlled environment such as light levels, color temperatures, or other controlled environmental parameters.

At (2), the image capture module 126 transmits the captured image to the image enhancement module 128. Those skilled in the art will recognize that the interactions at (2), (5), and (9) may include any form of communication that enables the receiving module to interact with the image, and are not limited to embodiments that actually transmit the image from one module to another. For example, in various embodiments, the image capture module 126 may store the captured image in a data store (such as the image data store 124 of FIG. 1) and/or may provide a link, file handle, memory location, API call, or other information enabling the image capture service 126 to obtain the image rather than transmitting the image directly.

At (3), the image enhancement module 128 determines one or more image enhancements to apply to the image. The image enhancement module 128 may determine image enhancements based on user input, characteristics of the captured image, its own criteria, the criteria of the image validation module 130, or any combination thereof. For example, the image enhancement module 128 may have the criterion that the subject of an image should fill at least 85% of the image, and may determine an image crop based on this criterion. In some embodiments, as described above, the image enhancement module 128 may determine image enhancements by testing whether an image with the potential enhancement will be validated by the image validation module 130. Thereafter, at (4), the image enhancement module 128 applies the determined enhancements to the image to produce an enhanced image, and at (5) the image enhancement module 128 transmits the enhanced image to the image validation module 130.

In various embodiments, the interactions at (1), (2), (3), (4), and (5) may be omitted, reordered, or combined in various ways. For example, the image capture module 126 may determine and apply enhancements "in-camera" prior to image capture, or may transmit an unenhanced image to the image validation module 130, which may determine and apply a set of enhancements that cause the image to validate.

At (6), the image validation module 130 requests validation criteria from the validation criteria data store 132. In some embodiments, the validation criteria may vary according to the subject of the image. For example, an image of an item that has a reflective surface may require a lower brightness, or an image of a multicolored item may require a different color balance. As a further example, a category or a type of subject, such as a consumer electronics product or an item of jewelry, may have separate or additional validation criteria. In further embodiments, the validation criteria may vary according to other factors. For example, various applications may invoke the image validation module 130 with application-specific criteria. At (7), the image validation module 130 receives the validation criteria from the validation criteria data store 132. In some embodiments, the image validation module 130 may obtain validation criteria from an external source, such as the networked image validation module 154 or the networked computing service 150 of FIG. 1. Further, in various embodiments, the interactions at (6) and (7) may precede or be carried out in parallel with the interactions at (1)-(5).

At (8), the image validation module 130 applies the validation criteria to the enhanced image. In the embodiment illustrated in FIG. 2, the enhanced image satisfies the validation criteria and the image validation module 130 produces a validated enhanced image. In embodiments where the enhanced image does not satisfy the validation criteria, the image validation module 130 may instead report which criteria were not satisfied, and may further provide guidance on how to satisfy these criteria. For example, the image validation module 130 may report that the image was too dark, and advise that the image should be enhanced to increase its brightness level. The image validation module 130 may illustratively provide a user interface that provides information regarding whether the image passed validation and feedback on how to retake or enhance the image. The image validation module 130 may also provide such feedback through an API, allowing another program or service (for example, the image enhancement module 128 or the image capture module 126) to present or act upon the feedback.

At (9), the image validation module 130 transmits the validated image to the validated image upload module 134. As noted above, the image capture module 126, image enhancement module 128, image validation module 130, and the validated image upload module 134 may exchange information regarding the image in any number of variations beyond the interactions depicted in FIG. 2. For example, an application may interact directly with each of the image capture module 126, the image enhancement module 128, the image validation module 130, and the validated image upload module 134, rather than the services interacting with each other. As a further example, the image validation module 130 may store an indication that an image has been validated, and the validated image upload module 134 may be invoked at a later time (e.g., manually by the user) with the indication and the image as inputs. In some embodiments, the indication may be embedded in the image as a digital watermark or image metadata.

At (10), the validated image upload module 134 uploads the image to the networked image collection module 152 of the networked computing service 150 via the network 140. As discussed above, the validated image upload module 134 may also upload information that allows the networked computing service 150 to authenticate that the image has been validated by an approved image validation module 130.

Figure 3A:
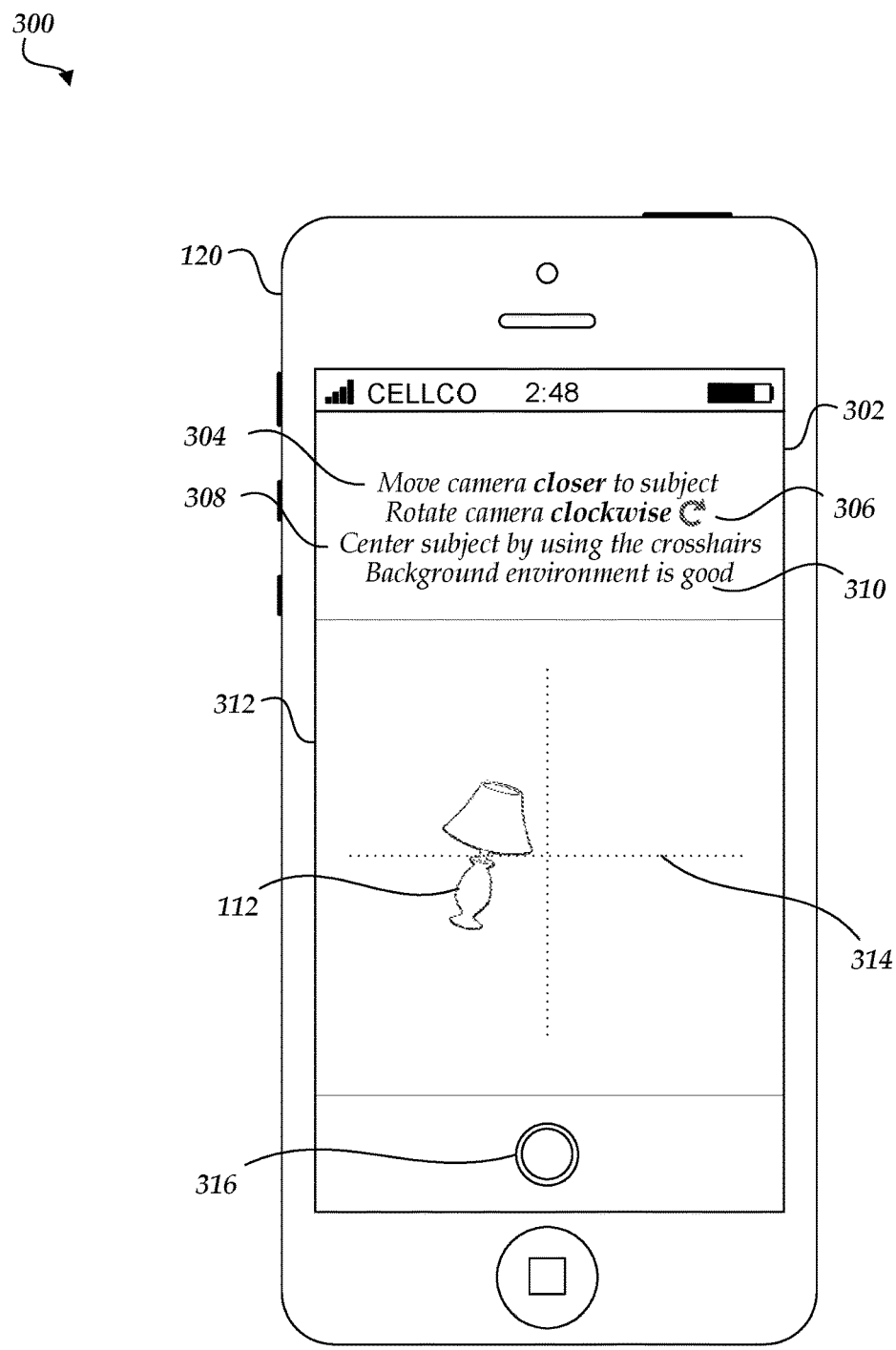
FIG. 3A is an illustrative user interface that enables a user to capture an image via an image capture module.

Turning now to FIG. 3A, an illustrative user interface 300 for image capture will be described. The user interface 300 may be provided, for example, by the image capture module 126 of FIG. 1. The user interface 300 provides controls such as a viewfinder image 312 and an image capture button 316. In some embodiments, the user interface 300 provides an image feedback panel 302, which displays information regarding the image that has been captured or is about to be captured. For example, the image feedback panel 302 may display distance feedback message 304, which may indicate that the camera should be moved closer to the subject 112 of the image, moved further away from the subject 112, or that the subject 112 is a suitable distance from the camera. As a further example, the image feedback panel may display rotation feedback message 306, which may indicate that the camera should be rotated clockwise, counter-clockwise, or that the camera is aligned with the subject. Still further, the image feedback panel may display centering feedback message 308, which may indicate whether the subject is centered in the image, or background environment feedback message 310, which may provide feedback regarding the uniformity of the background, the image exposure, color balance, or other background or environment issues. In various embodiments, more or fewer messages than those illustrated in FIG. 3A may be displayed. For example, messages may be displayed indicating that the image is out of focus, that a controlled environment has been detected, or that the background is too cluttered or too dark.

In some embodiments, the messages 304, 306, 308 and 310 may be or may include a checkmark, green light, "OK" sign, or other indication that an image will pass some or all of the validation tests performed by, e.g., the image validation module 130 of FIG. 1. In further embodiments, the user interface 300 may include a level indicator 314. Illustratively, the level indicator 314 may be superimposed on the viewfinder image 312, displayed as a separate user interface element, or combinations thereof. The image capture button 316 may be displayed and may enable image capture at any time, or in some embodiments may only be displayed and/or enabled when the image satisfies one or more criteria or passes one or more validation tests. In further embodiments, the image capture button 316 may be omitted, and an image may automatically be captured when it meets criteria or passes validation tests.

Figure 3B:
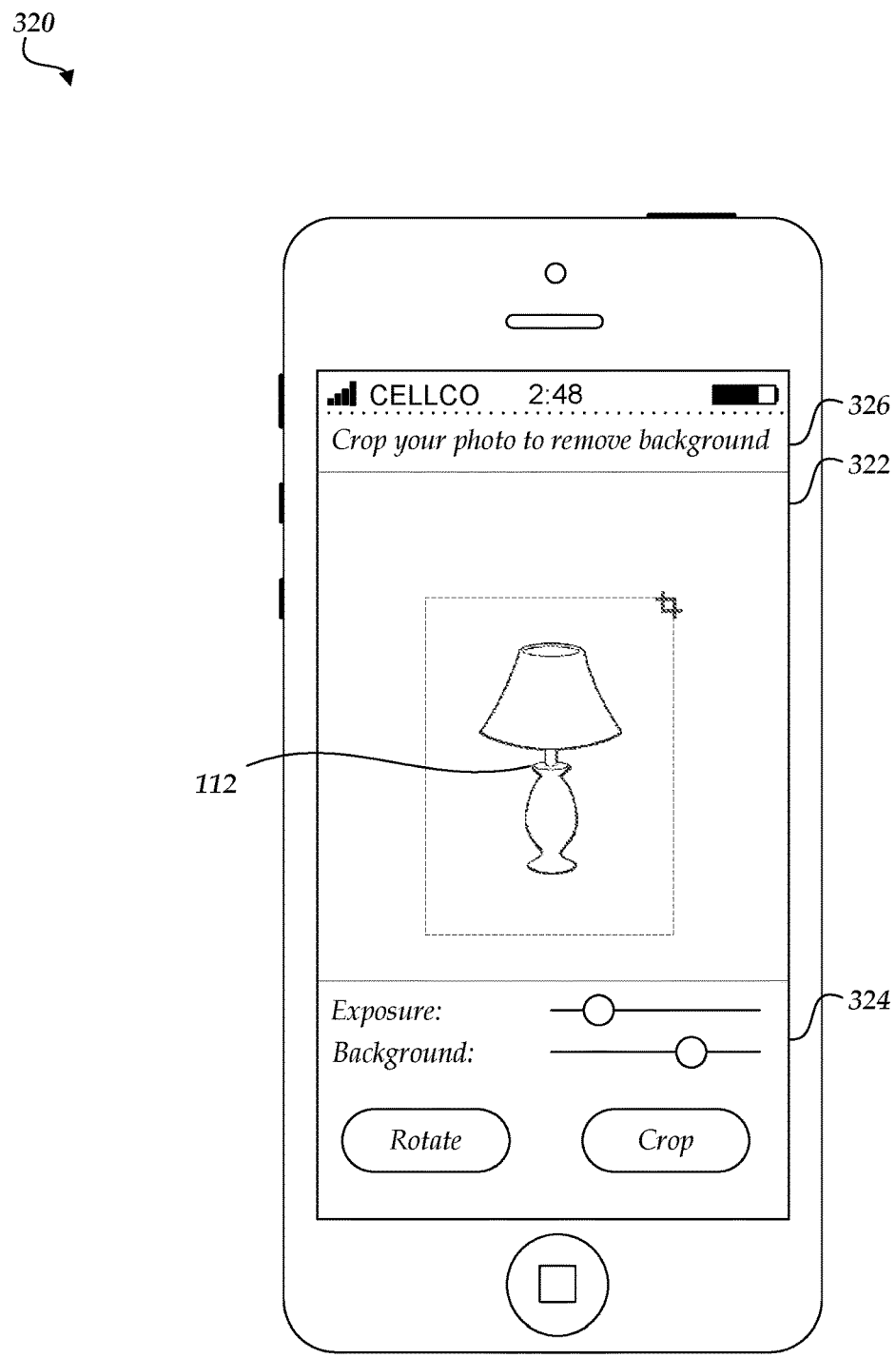
FIG. 3B is an illustrative user interface that enables a user to enhance an image via an image enhancement module.

Turning now to FIG. 3B, an illustrative user interface 320 for image enhancement will be described. The user interface 320 may be provided, for example, by the image enhancement module 128 of FIG. 1. The user interface 320 includes digital image editing controls 324, which may be used to select and apply enhancements to the digital image. Enhancements may include, for example, changing the exposure of the image, modifying or removing the background, cropping the image, rotating the image, and so forth. The user interface 320 further includes a digital image display 322, which dynamically displays the effects of using the editing controls 324 on the digital image. In some embodiments, the user interface 320 displays an image feedback message 326, as described above. Illustratively, the image feedback message 326 may indicate that that image should be cropped, rotated, or that other editing controls should be used to enhance the image. In some embodiments, as described above, enhancements may be determined and applied automatically, and the results displayed for approval, rather than displaying recommendations that the user make enhancements.

Figure 3C:
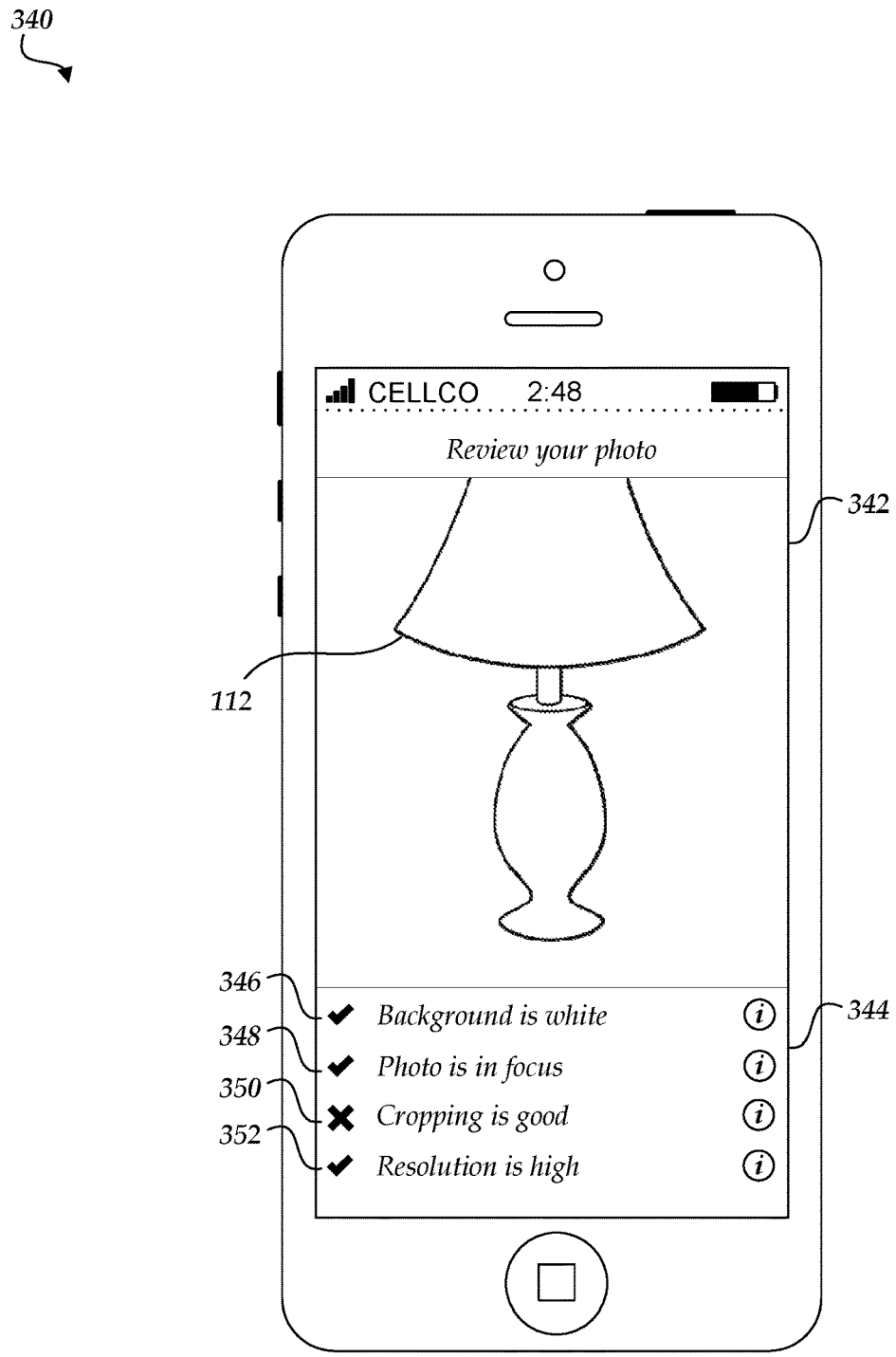
FIG. 3C is an illustrative user interface that enables a user to validate an image via an image validation module.

Turning now to FIG. 3C, an illustrative user interface 340 for image validation will be described. The user interface 340 may be provided, for example, by the image validation module 130 of FIG. 1. The user interface 340 includes a digital image display 342, which may display an enhanced or unenhanced image of the subject 112, and which may further display feedback regarding image validation. The user interface 340 further includes a feedback message display 344 regarding validation criteria applied to the image, which may indicate whether the image satisfied the criteria. The feedback message display 344 may provide further information to facilitate capturing and enhancing an image such that the image satisfies the criteria. For example, in the illustrated embodiment, the feedback message display 344 includes feedback messages 346, 348, 350, and 352, which indicate that the image has satisfied an image background criterion, an image focus criterion, and an image resolution criterion, but indicate that the image did not satisfy an image cropping criterion.

Figure 3D:
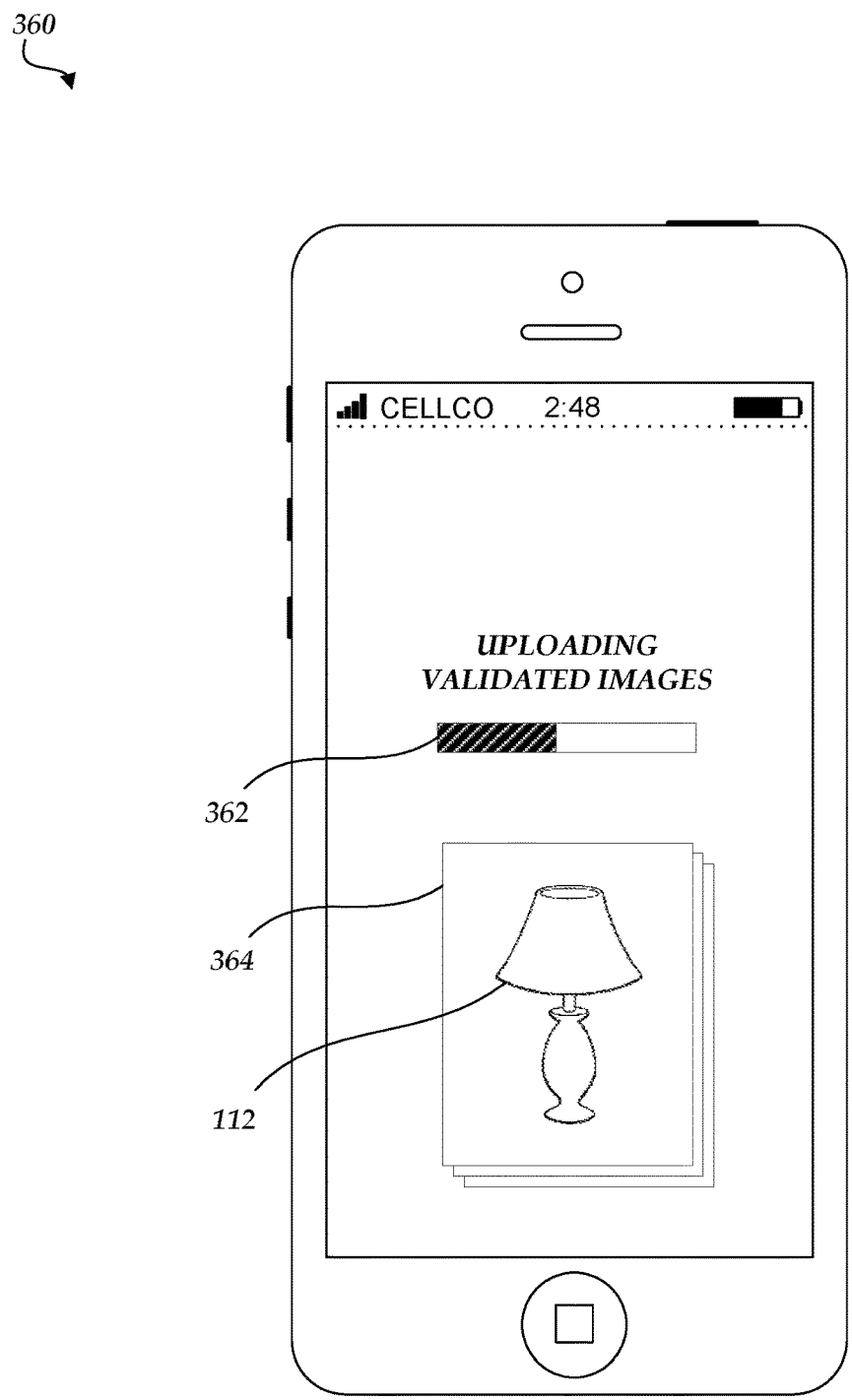
FIG. 3D is an illustrative user interface that enables a user to upload validated images to a networked computing service via a validated image upload module.

Turning now to FIG. 3D, an illustrative user interface 360 for uploading a validated image will be described. The user interface 360 may be provided, for example, by the validated image upload module 134 of FIG. 1. The user interface 360 includes a validated digital image catalog 364, which may display one or more validated digital images of the subject 112. In some embodiments, the user interface 360 may include controls for selecting validated digital images and uploading them to a networked computing service.

Figure 4:
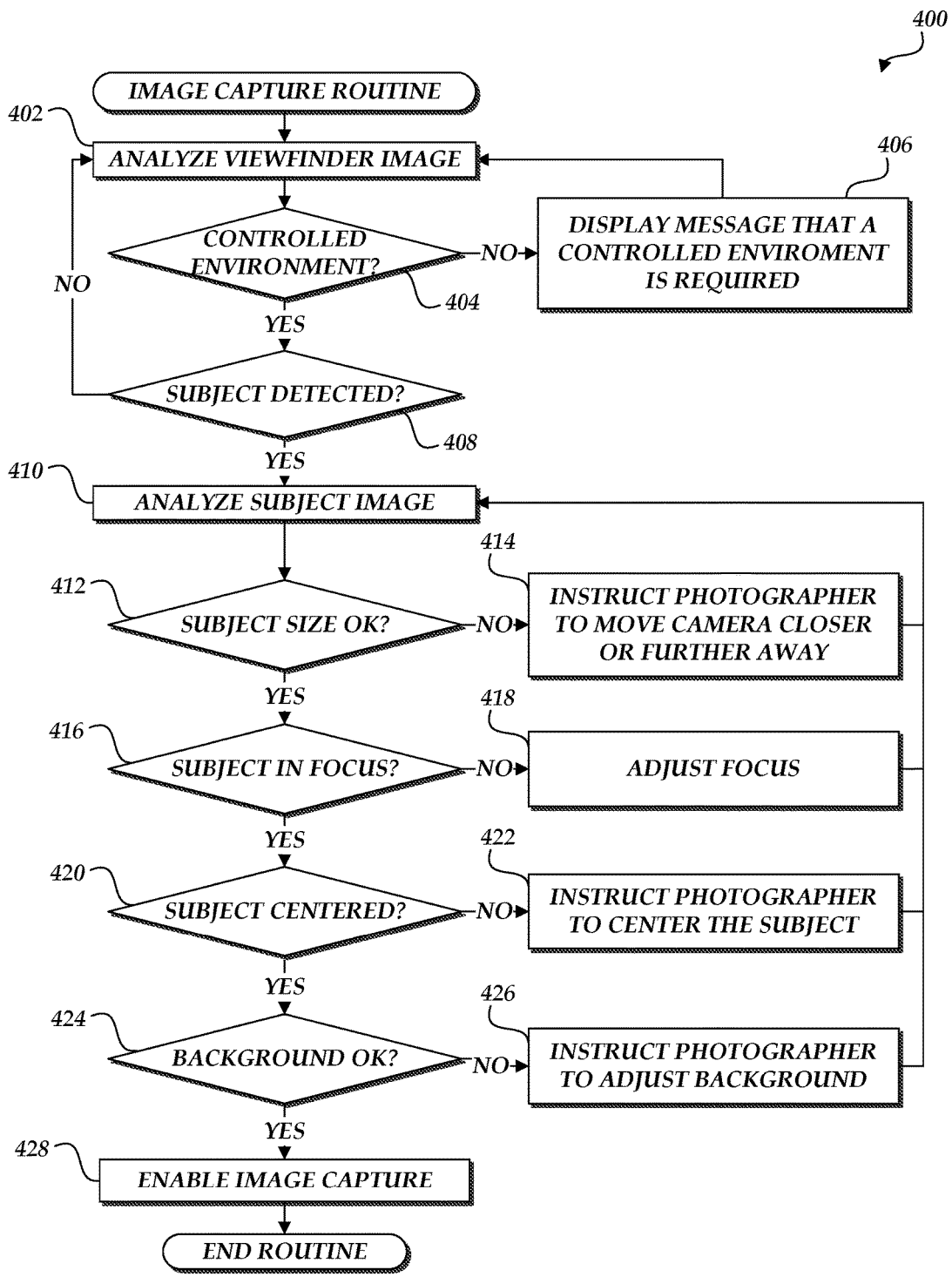
FIG. 4 is a flow diagram depicting an illustrative image capture routine in accordance with aspects of the present disclosure.

FIG. 4 depicts an illustrative image capture routine 400 in accordance with aspects of the present disclosure. The illustrative routine 400 may be carried out, for example, by the image capture module 126 of FIG. 1. At block 402, a viewfinder image may be analyzed. In some embodiments, at decision block 404, a determination is made regarding detection of a controlled environment. A controlled environment may illustratively be detected by analyzing the viewfinder image or by detecting or analyzing other inputs, such as an RFID signal or a WiFi signal. In some embodiments, if a controlled environment is not detected, the routine 400 branches to block 406, where a message may be displayed indicating that a controlled environment is required. In other embodiments, a message may be displayed recommending a controlled environment, displaying one or more degrees of variation from a controlled environment (e.g., that lighting conditions are darker or lighter than recommended, that the background is too detailed, etc.). In yet other embodiments, such as embodiments in which use of a controlled environment is not contemplated, blocks 402, 404 and 406 may be omitted.

At decision block 408, a determination is made as to whether a subject has been detected. If not, the routine 400 branches to block 402 and analyzes a subsequent viewfinder image, and may continue to analyzes images from a stream of digital viewfinder images until an image containing a subject is detected.

At block 410, a digital image of the subject (or, as described above, a series of digital viewfinder images of the subject) may be analyzed to identify characteristics of the subject, such as the subject's size relative to the image size, lighting of the subject, contrast between the background and the subject, and so forth. At decision block 412, a determination may be made as to whether the ratio of subject size to image size falls within an acceptable range. For example, the analysis may determine that the subject occupies 20% of the area of the image, and the acceptable range may be predetermined to be 50% to 75%. The routine 400 may thus determine that the subject size is too small relative to the image size. At block 414, if a determination is made that the subject size is too small or too large, a message or other feedback may be provided to instruct the photographer to move the camera relative to the subject so that the subject size is brought within the acceptable range. The routine 400 then returns to block 410, and continues to analyze viewfinder images containing the subject until an image is analyzed with a size ratio that falls within the range. In some embodiments, as in the example above, the acceptable subject size range may be predetermined. In other embodiments, the size range may be determined based on validation criteria or on characteristics of the subject. For example, a long, narrow subject may be determined to have a size range of 25% to 50% in order to allow the entire subject to fit within the image.

At decision block 416, a determination is made as to whether the subject is in focus. If the subject is out of focus, the routine 400 branches to block 418. In some embodiments, the routine 400 can adjust the focal length of the camera lens, and thus at block 418 the focal length may be adjusted to bring the subject into focus. In other embodiments, a message may be displayed at block 418 informing the photographer that the image is out of focus or instructing the photographer to adjust the focus. The routine 400 then returns to block 410.

If and when the image is in focus, the routine 400 branches to decision block 420, where a determination may be made as to whether the subject is centered within the image. If the subject is not centered, then at block 422 a message may be displayed instructing the photographer to center the image on the subject. In some embodiments, decision block 420 may consider other criteria, such as subject size or image resolution, when determining whether the subject is adequately centered within the image. The routine 400 then returns to block 410 and continues analyzing images of the subject. If the subject is centered, the routine 400 branches to decision block 424.

At decision block 424, a determination is made as to whether the image's background is acceptable. Illustratively, the determination may be based on whether there is sufficient contrast between the subject and the background, whether the background is a uniform color, whether background lighting is consistent and adequate, or other factors. In some embodiments, the routine 400 may control camera settings such as a focus range, a flash or other lighting controls, or other controls affecting the background, and may activate, deactivate, or adjust these controls to improve the background characteristics. In some embodiments, the routine 400 may detect the boundaries of a uniform background, and may assess or re-assess image characteristics based on the uniform background. For example, the subject may be placed in front of a blank sheet of paper, a projection screen, or another surface that provides a uniform background. The routine 400 may determine the boundaries of this uniform background surface, and may analyze the image as though it had been cropped to the boundaries of the uniform background. In some embodiments, the image may be automatically edited to remove non-uniform background that appears outside the uniform background. For example, if the subject is placed in front of a sheet of paper, but the image includes non-uniform background (such as carpet or a wall) past the edges of the paper, the non-uniform background may be automatically replaced with the color or pattern of the uniform portion (such as the color of the paper) or may be automatically cropped out.

In the embodiment illustrated in FIG. 4, if the background is not acceptable, the routine 400 branches to block 426, where a message may be displayed instructing the photographer to take corrective action. The routine 400 then continues at block 410. If the background is acceptable, the routine 400 branches to block 428, where image capture may be enabled. In some embodiments, the routine 400 may control image capture, and may cause the analyzed subject image to be captured at block 428. In other embodiments, a user interface element, such as an image capture button, may be enabled or made visible to permit image capture by the photographer. In further embodiments, a message may be displayed instructing the photographer to capture the image.

One skilled in the art will appreciate that decision blocks 412, 416, 420, and 424 may be carried out in any order, and that the present disclosure encompasses routines with more or fewer decision blocks. For example, a determination may be made that the camera is not on a level with the subject, and a message may be displayed instructing the photographer to rotate the camera clockwise or counter-clockwise to bring the camera and subject into alignment. As a further example, a determination may be made as to whether a color balance of the subject falls within an acceptable range. In some embodiments, validation criteria may be applied to the image, and the results of applying the criteria may be displayed with or without feedback messages that provide information or instructions.

Figure 5:
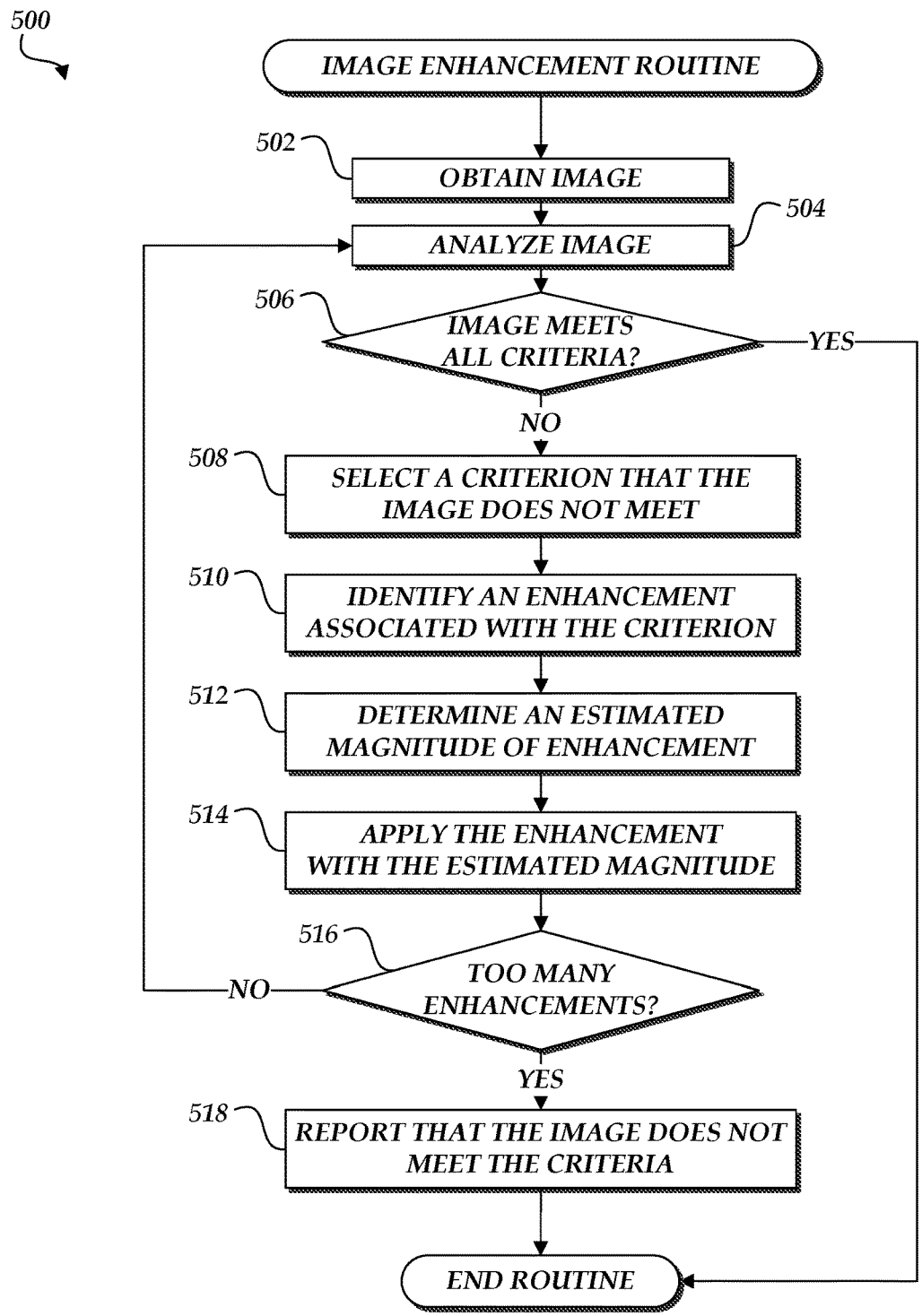
FIG. 5 is a flow diagram depicting an illustrative image enhancement routine in accordance with aspects of the present disclosure.

FIG. 5 depicts an illustrative image enhancement routine 500 in accordance with aspects of the present disclosure. The illustrative routine 500 may be carried out, for example, by the image enhancement module 128 of FIG. 1. At block 502, a digital image may be obtained. In some embodiments, the digital image may be obtained from an image capture module, such as the image capture module 126 of FIG. 1. In other embodiments, the digital image may be obtained from other sources. For example, an image may be obtained from a data store, such as the image data store 124 of FIG. 1.

At block 504, the image may be analyzed to determine whether it meets various image criteria. In various embodiments, as described above, the criteria may be predetermined, may be determined by the routine 500, may be based on or associated with criteria applied by an image validation module, or may be the criteria applied by the image validation module. In some embodiments, the criteria may be determined based on characteristics of the computing device carrying out illustrative routine 500, such as available computing resources (e.g., processing power, memory, battery, and the like) or a time delay associated with applying various criteria.

At decision block 506, a determination may be made as to whether the image meets all of the criteria. If so, the routine 500 ends. In some embodiments, a message may be displayed indicating to the user that the image meets the criteria. If the image does not meet one or more of the criteria, then at block 508 a criterion that the image does not meet may be selected. For example, a determination may be made at block 506 that the image does not meet a color balance criterion and does not meet an image skew criterion (i.e., the image is crooked), and the image skew criterion may be selected at block 508.

At block 510, an enhancement may be identified that is associated with the criterion. For example, an image rotation enhancement may be identified that is associated with the image skew criterion. In some embodiments, each criterion may be associated with a particular enhancement. In various other embodiments, multiple enhancements (applied in various sequences and combinations) may be associated with a criterion or criteria. In further embodiments, some criteria may not be associated with an enhancement. For example, an image focus criterion may not be associated with an enhancement. In such embodiments, a determination may be made after block 508 that the selected criterion that does not have an associated enhancement, in which case the routine 500 branches to block 518.

At block 512, an estimated magnitude of enhancement may be determined. For example, a determination may be made that rotating the image eight degrees clockwise may cause the image to satisfy the image skew criterion. As a further example, a determination may be made that cropping the rightmost 20% of the image and the bottom 10% of the image may cause the image to satisfy a centering criterion. In some embodiments, the magnitude of enhancement may be determined so as to put the image in the middle of an acceptable range. In other embodiments, the smallest enhancement that puts the image within an acceptable range may be determined. In some embodiments, a direction (e.g., clockwise) may be determined rather than a magnitude. In further embodiments, the magnitude and/or direction of enhancement may be determined based on user input, such as input utilizing a slider UI control to adjust an image's brightness. In still further embodiments, blocks 504-514 may provide dynamic feedback as user interface controls are utilized.

At block 514, the enhancement may be applied with the estimated magnitude. In some embodiments, a determination may be made as to whether the applied enhancement causes the image to "overshoot" an acceptable range, and if so the estimated magnitude may be halved or otherwise reduced and the enhancement re-applied. At block 516, in some embodiments, a determination may be made as to whether the number of enhancements applied to the image exceeds a threshold. In embodiments where enhancements are determined and applied without user input, for example, a maximum number of enhancements may be predetermined in order to allow the routine 500 to end if enhancements are not causing the image to satisfy the criteria. If the number of enhancements applied is below the limit, the routine 500 branches to block 504 and analyzes the enhanced image. In some embodiments, decision block 516 may be omitted and the routine 500 may proceed from block 514 to block 504.

If the image does not satisfy all criteria, and a threshold number of enhancements have been applied without bringing the image into compliance with the criteria, then the routine 500 branches to block 518, where a report may be made that the image does not meet the criteria. For example, a message may be displayed to the user describing the criteria that the image does not meet, and to provide information on how to capture images that satisfy the unmet criteria. In some embodiments, a report may be made to an image capture module or an image verification module, which may have invoked the routine 500 on an image that it was processing. The routine 500 may further report or provide a list of enhancements that cause an image to satisfy the criteria.

Figure 6:
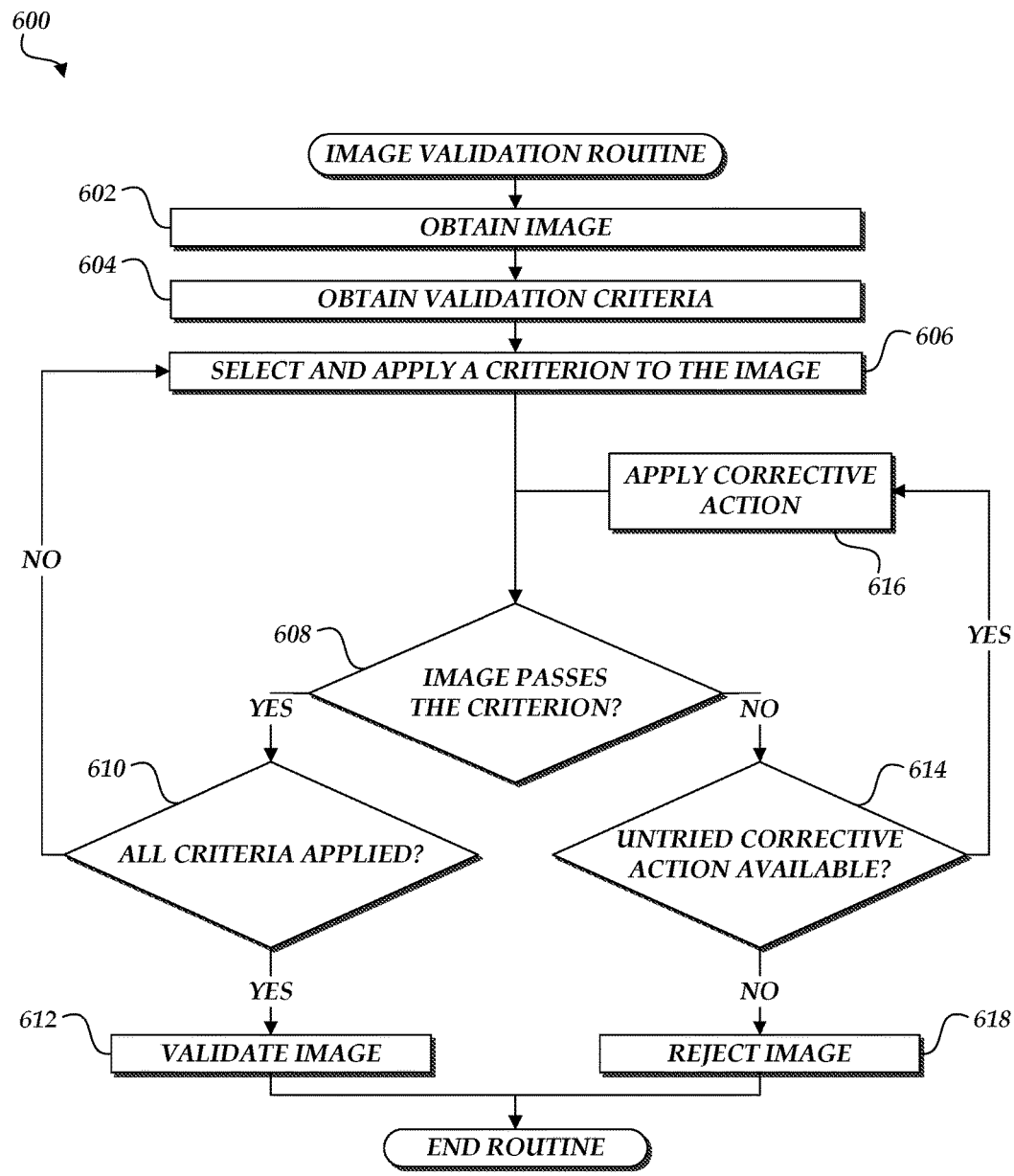
FIG. 6 is a flow diagram depicting an illustrative image validation routine in accordance with aspects of the present disclosure.

With reference now to FIG. 6, an illustrative image validation routine 600 will be described. The routine 600 may be carried out, for example, by the image validation module 130 of FIG. 1. At block 602, an image may be obtained. In various embodiments, the image may be obtained from an image capture module, an image enhancement module, a data store, a camera, or any other image source.

At block 604, image validation criteria may be obtained. As described above, image validation criteria may be obtained from a local data store, such as the validation criteria data store 132 of FIG. 1, from an external source such as the networked computing service 150 of FIG. 1, or the image validation module may dynamically determine validation criteria based on characteristics of the image, characteristics of the computing device that carries out routine 600, or other factors. Validation criteria may be specified as ranges (e.g., the image's color temperature must be between 3000K and 4500K), conditions (e.g., the image's center must overlap the subject), thresholds (e.g., the subject must fill at least 50% of the image's area), or other standards.

At block 606, an untested criterion may be selected and applied to the image. Thereafter, at decision block 608, a determination may be made as to whether the image passes the criterion. If the image passes the criterion, the routine 600 branches to block 610, where a determination is made as to whether all criteria have been applied to the image. If so, the routine branches to block 612, where the image may be validated. Illustratively, the image may be validated by modifying the image to include a validation checksum, watermark, metadata, or other indicator; by generating an authentication token and associating it with the image; by storing information indicating that the image has been validated; or by reporting to a user or other entity that the image passed validation. If all criteria have not been applied to the image, then the routine 600 instead branches to block 606, where another untested criterion may be selected and applied.

In some embodiments, if a determination is made at block 608 that the image did not pass the criterion, the routine 600 branches to decision block 614, where a determination may be made as to whether an untried corrective action is available. For example, a criterion may be associated with one or more corrective actions, such as enhancing the image in a particular way, that may cause the image to satisfy the criterion. If an untried corrective action is available, then at block 616 the corrective action may be applied. Illustratively, the untried corrective action may be to apply an enhancement to the image, or to cause an image enhancement routine, such as routine 500, to be carried out upon the image. The routine then returns to decision block 608, where a determination may be made as to whether the enhanced image passes the criterion. If the enhanced image passes the criterion, then the routine branches to block 610 and continues applying criteria. In some embodiments, the routine 600 may determine that one or more previously applied criteria will be re-applied to an enhanced image. For example, if cropping the image causes it to pass a criterion that the subject is centered, a criterion that puts an upper bound on a subject-to- image size ratio may need to be re-applied. The routine 600 may further detect that enhancing the image to pass one criterion causes it to fail another, and vice versa, and therefore abandon further attempts to enhance the image. In further embodiments blocks 614 and 616 may be omitted, and decision block 608 may branch to block 618 if a determination is made that the image does not satisfy a criterion.

At block 618, an image may be rejected for failing to satisfy the validation criteria. In various embodiments, as described above, information may be provided as to which criteria the image failed to satisfy, how the image may be enhanced to satisfy these criteria, and/or how to capture an image that satisfies the criteria. Information that indicates an image did not pass validation may be combined with the image, stored in a data store, and/or reported to a user or other entity, as described above.

Figure 7:
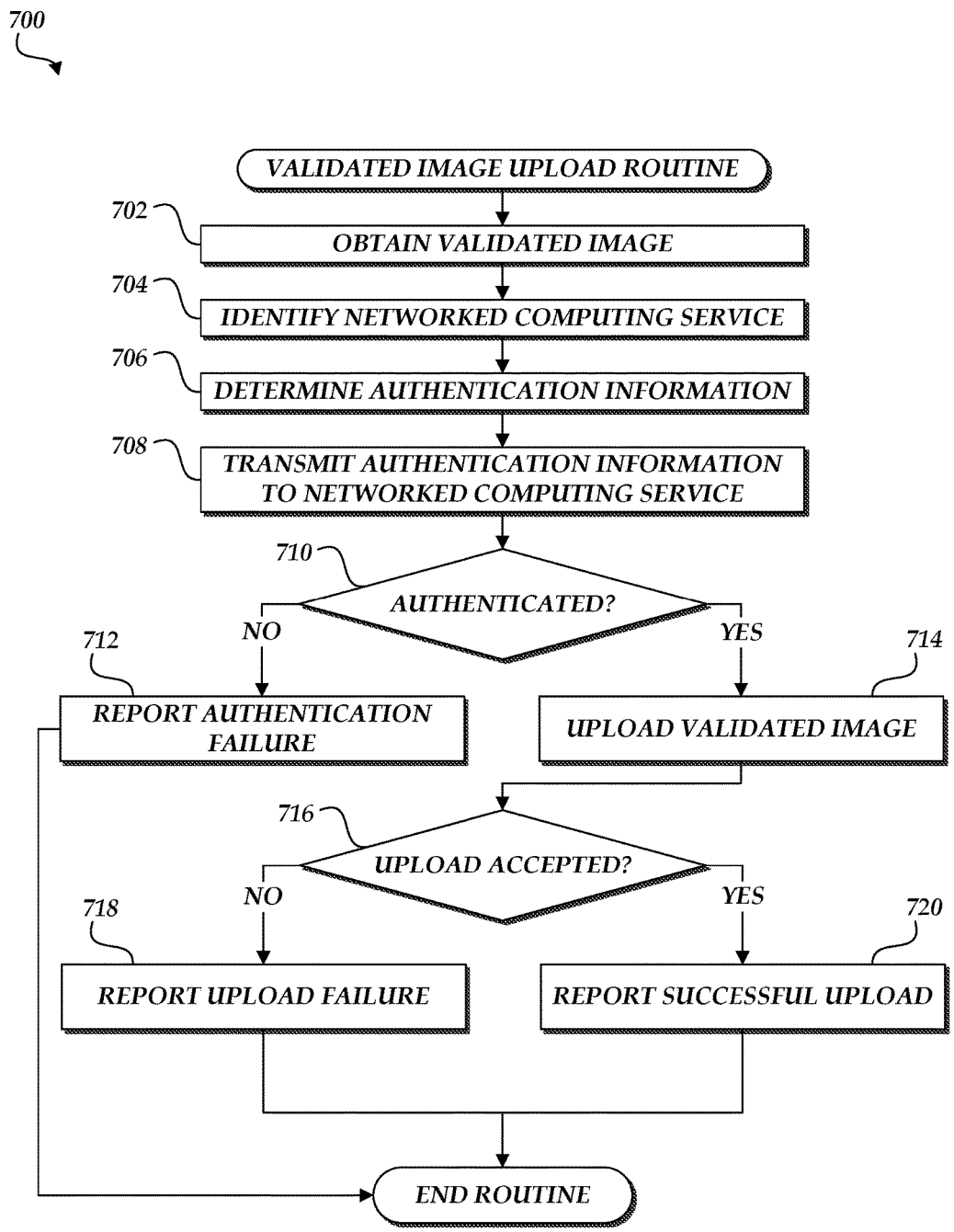
FIG. 7 is a flow diagram depicting a validated image upload routine in accordance with aspects of the present disclosure.

Turning now to FIG. 7, an illustrative validated image upload routine 700 in accordance with aspects of the present disclosure will be described. The routine 700 may be carried out, for example, by the validated image upload module 134 of FIG. 1.

At block 702, a validated image may be obtained. Illustratively, a validated image may be obtained from a module such as the image validation module 130 of FIG. 1, from a data store (e.g., the image data store 124 of FIG. 1), or another source of validated images. In some embodiments, a number of validated images may be obtained, and the routine 700 may queue validated images or upload them as a batch. In further embodiments, validated images may be batched according to, for example, the set of validation criteria applied to the images, the subject or subjects of the images, or other characteristics.

At block 704, a networked computing service may be identified. In some embodiments, the networked computing service may be predetermined, in which case block 704 may be omitted. In other embodiments, a networked computing service may be identified based on, for example, the validation criteria applied to the image, the subject of the image, user input, or other criteria.

At block 706, authentication information may be determined. Illustratively, authentication information may be determined for the validated image. For example, a checksum, watermark, or authentication token may be identified and associated with the image, as described above. In some embodiments, authentication information may be determined for the image validation module, the set of criteria used to validate the image, or the validated image upload service rather than for the image itself. For example, a version number may be determined that identifies the criteria applied to the image, or a public key may be determined that allows the networked computing service to authenticate the image validation module. In further embodiments, blocks 702, 704, and 706 may be carried out in different orders than the one illustrated in FIG. 7. For example, authentication information may be determined before obtaining a validated image or identifying a networked computing service.

Thereafter, at block 708, authentication information may be transmitted to the identified networked computing service. In some embodiments, the authentication information itself may not be transmitted, and may instead provide instructions that the routine 700 utilizes to authenticate with the networked computing service. At decision block 710, a determination is made as to whether authentication was successful. As described above, authentication to the networked computing service may fail for a variety of reasons. For example, the criteria that the networked computing service uses to validate images may have changed such that the previous criteria are no longer acceptable.

If a determination is made that authentication was unsuccessful, then at block 712 an authentication failure may be reported. In some embodiments, information may be received from the networked computing service that enables future authentications to succeed. For example, the networked computing service may respond to a failed authentication attempt with information that allows the image validation module to update its validation criteria. In some embodiments block 712 may be omitted, and the routine 700 may instead branch to block 714 regardless of the outcome of the authentication attempt. For example, a networked computing service may continue to accept outdated image validations for a grace period after the validation criteria are updated, or may allow uploading but require post-upload validation.

If authentication is successful, then the routine 700 branches to block 714, where the validated image may be uploaded. In some embodiments, as described above, a set of validated images may be uploaded, and in further embodiments blocks 706, 708, and 710 may be carried out on a per-image basis.

At block 716, a determination may be made as to whether the networked computing service accepted the upload of the validated image. If not, then at block 718 an upload failure may be reported. In some embodiments, the routine 700 may determine a cause of the upload failure, and if the cause is transient (e.g., a network issue, throttling at the networked computing service, etc.) may re-queue the validated image for a later upload attempt. For example, the routine 700 may determine that the cause of the failure was a temporary issue, wait a predetermined time period, and then return to block 714. If the networked computing service accepted the upload, then at block 720 a successful upload may be reported. In some embodiments, information indicating that the validated image has been uploaded may be stored with the image and/or in a data store, as described above.

Figure 8:
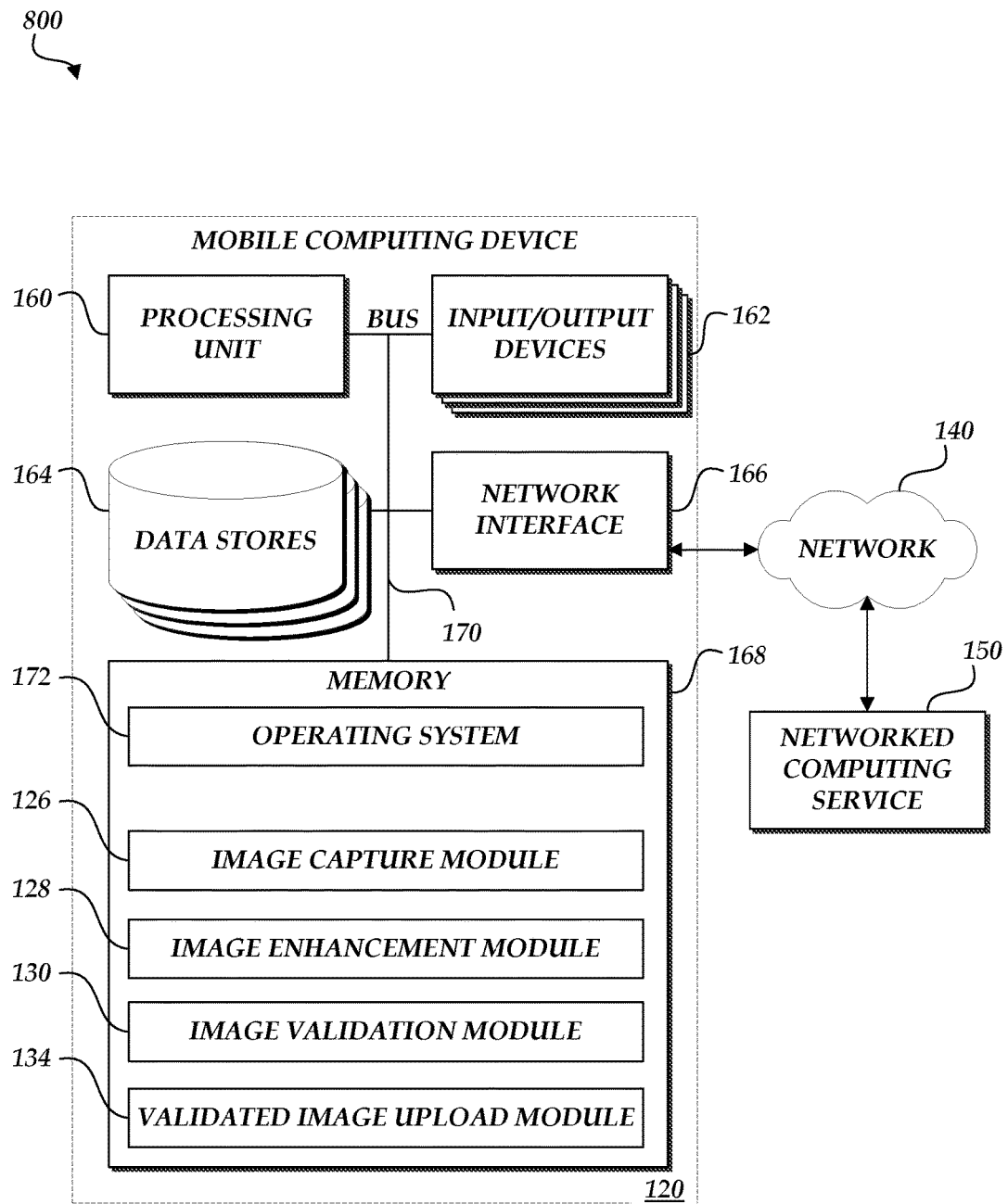
FIG. 8 is a general architecture of an example mobile computing device that is configured to implement an image validation module.

FIG. 8 depicts a general architecture of an example mobile computing device 120 configured to implement aspects of the present disclosure. The general architecture of the computing device 120 depicted in FIG. 8 includes an arrangement of computer hardware and software components. The computing device 120 may include many more (or fewer) elements than those shown in FIG. 8. It is not necessary, however, that all of these generally conventional elements be shown in order to provide an enabling disclosure. As illustrated, the computing device 120 includes a processing unit 160, input/output devices 162, data stores 164, a network interface 166, and a memory 168, all of which may communicate with one another by way of a communication bus 170. The network interface 166 may provide connectivity to one or more networks or computing systems. For example, the network interface 166 may provide connectivity to the networked computing service 150 via the network 140. The processing unit 160 may thus receive information and instructions from other computing systems or services via a network. The processing unit 160 may also communicate to and from the memory 168, and further provide output information via the input/output devices 162. The input/output devices 162 may include the camera 122 of FIG. 1 as well as devices such as a keyboard, mouse, digital pen, microphone, audio speaker, touch screen, gesture recognition system, voice recognition system, gamepad, accelerometer, gyroscope, fingerprint reader, haptic feedback mechanism, or other input/output device.

The memory 168 may contain computer program instructions (grouped as modules or components in some embodiments) that the processing unit 160 executes in order to implement one or more embodiments. The memory 168 generally includes RAM, ROM and/or other persistent, auxiliary or non-transitory computer-readable media. The memory 168 may store an operating system 172 that provides computer program instructions for use by the processing unit 160 in the general administration and operation of the computing device 120. The memory 168 may further include computer program instructions and other information for implementing aspects of the present disclosure. For example, in various embodiments, the memory 168 includes one or more of an image capture module 126, an image enhancement module 128, an image validation module 130, and a validated image upload module 134. These services may reside in memory 168 as separate components or may be combined. In addition, memory 370 may include or communicate with data stores 164, which may include the image data store 124 and validation criteria data store 132 of FIG. 1.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

the various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by a mobile computing device configured with specific executable instructions,
        obtaining, by the mobile computing device, a digital image of a subject, wherein obtaining the digital image comprises capturing the image via a camera associated with the mobile computing device;
        applying, by the mobile computing device, one or more enhancements to the digital image to produce an enhanced digital image;
        determining, by the mobile computing device, one or more criteria for validating digital images, the one or more criteria corresponding to criteria used by a networked computing service to validate digital images of the subject, the one or more criteria determined based at least in part on a type of the subject;
        applying, by the mobile computing device, each of the one or more criteria to the enhanced digital image to determine that the enhanced digital image satisfies the one or more criteria; and
        in response to determining that the enhanced digital image satisfies the one or more criteria, uploading, by the mobile computing device, the enhanced digital image to the networked computing service.

2. The computer-implemented method of claim 1, wherein the subject comprises at least one of a person, animal, article of clothing, item of jewelry, vehicle, real property, landmark, or product.

3. The computer-implemented method of claim 1, wherein the one or more enhancements to the digital image comprise at least one of cropping, rotating, adjusting the color balance, adjusting the brightness, adjusting the contrast, or applying a filter.

4. The computer-implemented method of claim 1, wherein the networked computing service comprises at least one of a photo gallery, dating service, e-commerce site, messaging service, social network, weblog, or comment system.

5. The computer-implemented method of claim 1, wherein applying the one or more criteria to the enhanced digital image comprises determining, for each criterion of the one or more criteria, that the enhanced digital image satisfies the criterion.

6. A mobile device comprising:
    a digital image data store configured to store digital images;

a validation criteria data store configured to store validation criteria; and a hardware processor in communication with the digital image data store and the validation criteria data store, the hardware processor configured to execute specific computer-executable instructions to at least:

retrieve a digital image of a subject from the data store;

identify, based at least in part on a type of the subject or a category of the subject, one or more validation criteria from the validation criteria store, the validation criteria corresponding to criteria used by a networked computing service to validate digital images of subjects associated with the type;

apply one or more enhancements to the digital image to produce an enhanced digital image;

apply the one or more validation criteria to the enhanced digital image to determine that the enhanced digital image satisfies the one or more validation criteria; and upload the enhanced digital image to the networked computing service.

7. The system of claim 6 further comprising a camera configured to capture digital images, wherein the hardware processor is further configured to:

capture the digital image of the subject using the camera; and store the digital image in the data store.

8. The system of claim 6, wherein the one or more validation criteria are identical to the criteria used by the network computing service to validate digital images of the subject.

9. The system of claim 6, wherein the one or more validation criteria are a subset of the criteria used by the network computing service to validate digital images of the subject.

10. The system of claim 6, wherein the hardware processor is further configured to determine the one or more enhancements to the digital image.

11. The system of claim 10, wherein the hardware processor is configured to determine the one or more enhancements to the digital image based at least in part on the one or more validation criteria.

12. The system of claim 6, wherein the hardware processor is further configured to:

apply the one or more validation criteria to the digital image to determine that the digital image does not satisfy at least one criterion of the one or more validation criteria;

obtain a plurality of potential enhancements to the digital image;

determine, out of the plurality of potential enhancements to the digital image, a set of potential enhancements that, when applied to the digital image, causes the digital image to satisfy the at least one criterion; and identify the set of potential enhancements as the one or more enhancements to be applied to the digital image to produce the enhanced digital image.

13. A mobile device comprising:

a validation criteria data store configured to store validation criteria; and a hardware processor in communication with the validation criteria data store, the hardware processor configured to execute specific computer-executable instructions to at least:

obtain a digital image of a subject;

obtain, based at least in part on a type of the subject or a category of the subject, one or more validation criteria, the validation criteria corresponding to criteria used by a networked computing service to validate digital images of the subject;

validate the digital image using the one or more validation criteria; and transmit information regarding the validation of the digital image.

14. The system of claim 13, wherein the information regarding the validation of the digital image comprises information regarding at least one criterion of the one or more validation criteria that the image did not satisfy.

15. The system of claim 13, wherein the information regarding the validation of the digital image comprises an authentication token associated with the digital image.

16. The system of claim 13, wherein the hardware processor is further configured to enhance the digital image by applying one or more enhancements.

17. The system of claim 16, wherein the hardware processor is further configured to select the one or more enhancements based at least in part on user input.

18. The system of claim 16, wherein the hardware processor is further configured to select the one or more enhancements based at least in part on the one or more validation criteria.

19. The system of claim 16, wherein the one or more validation criteria are obtained from the networked computing service.

* * * * *